United States Patent [19]

Bieber

[11] Patent Number: 4,890,535

[45] Date of Patent: Jan. 2, 1990

[54] APPARATUS AND METHOD FOR MEASURING AND DISPENSING POWDER

[76] Inventor: William J. Bieber, 21901 Adler Dr., California City, Calif. 93505

[21] Appl. No.: 301,187

[22] Filed: Jan. 24, 1989

[51] Int. Cl.⁴ .............................................. F42B 33/02
[52] U.S. Cl. ........................................... 86/31; 86/29; 86/33; 86/1.1; 141/167; 141/242; 222/305; 222/308
[58] Field of Search ............... 86/33, 31, 29; 141/167, 141/181, 242; 222/163, 165, 282, 305, 308

[56] References Cited

U.S. PATENT DOCUMENTS

| | | | |
|---|---|---|---|
| 347,455 | 8/1886 | Wonacott | 86/31 |
| 1,604,145 | 10/1926 | Candee | 86/31 |
| 2,856,807 | 10/1958 | Stutzman | 86/31 |
| 3,135,434 | 6/1964 | Mittelsteadt | 86/31 |
| 3,386,329 | 6/1968 | Rohrbacher | 86/31 |
| 3,426,946 | 11/1969 | Chamlee | 86/29 |
| 3,580,128 | 5/1971 | Leich | 86/31 |
| 3,656,518 | 4/1972 | Aronson | 86/31 |
| 3,752,033 | 8/1973 | Ross | 86/31 |
| 4,186,646 | 2/1980 | Martin | 86/29 |
| 4,289,258 | 9/1981 | Ransom | 222/308 |
| 4,418,606 | 12/1983 | Lee | 86/31 |

Primary Examiner—Howard J. Locker
Attorney, Agent, or Firm—Howson and Howson

[57] ABSTRACT

An ammunition powder measuring and dispensing apparatus in which a charging chamber rotates and translates in a helical course within a housing between inlet and outlet ports. The powder is gravity loaded and discharged from the chamber from a hopper above the inlet port and to a cartridge or shell below the outlet port. A micrometer-operated disc in the chamber adjusts the amount of the charge. The disc is concave to reduce crevices where powder can build up, and the chamber is tapered to small opening to improve cut-off leveling of powder at the inlet port.

14 Claims, 2 Drawing Sheets

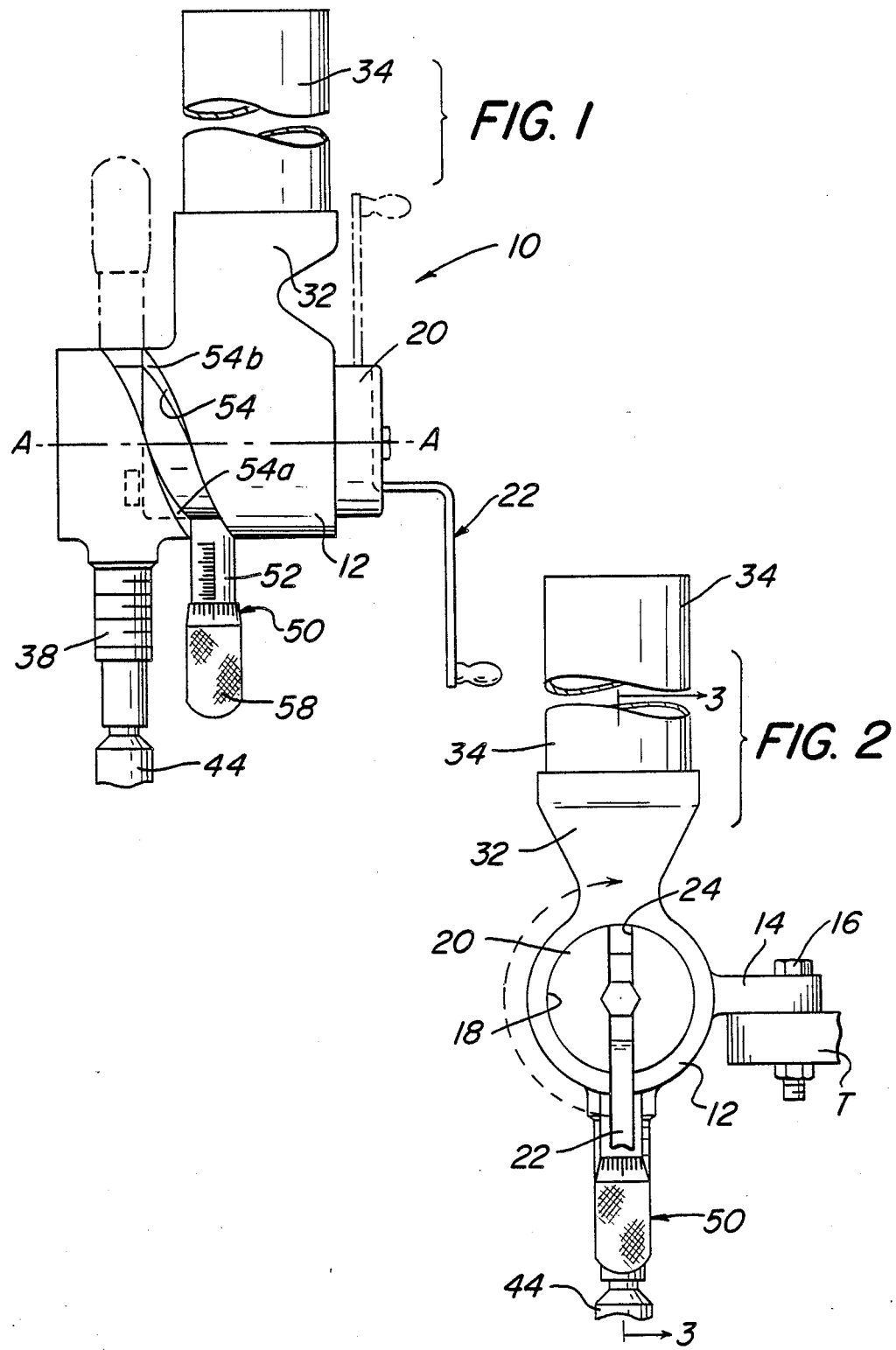

APPARATUS AND METHOD FOR MEASURING AND DISPENSING POWDER

BACKGROUND OF THE INVENTION

The present invention relates generally to dispensing apparatus, and more particularly to dispensing apparatus and method for measuring and loading ammunition powder in cartridges or shells.

Various configurations of dispensers and methods have been marketed or suggested for measuring and loading ammunition powder in cartridges, shells, or similar containers, all with the objective of quickly dispensing the amount of powder required for a specified ammunition. However, these devices and methods have not offered the measuring precision and consistency needed to throw charges for certain firearms which use very light powder charges, such as the .28 caliber Schuetzen rifle. Conventional benchrest and pistol powder measuring devices simply do not satisfy these requirements, even when "tuned up" or modified. Contributors to these deficiencies are the orientation and shape of the powder measuring chamber within the dispenser. Horizontal or inclined the measured powder into the cartridge due to some grains clinging to the lower surfaces of the chamber, and chambers with sharp internal corners or crevices allow the grains to build up unevenly between charges. The presence of crevices and niches in the chamber also makes it imperative in some dispensers to purge the chamber of all residue before changing to another type of powder. Some dispenser designs provide no visual access into the chamber to verify that the entire measured charge has dropped into the cartridge. Also, chambers with wide cut-off areas at their inlets are not completely filled because of uneven leveling of the powder across the opening.

These and other deficiencies in prior art powder measuring and dispensing devices sometimes lead to hazardous conditions. Insufficient powder or mixing of the powder with a different powder left in the dispenser from previous throws obviously effects firing power, and excess powder may cause damage to the firing mechanisms or even injury to the user.

SUMMARY OF THE INVENTION

Accordingly, it is an object of the present invention to provide an improved powder measuring and dispensing apparatus and method suitable for loading cartridges, shells and the like with a high degree of precision.

Another object is to provide a powder measuring and dispensing apparatus which is substantially free of residue powder after each charge thrown.

Still another object is to provide a powder dispenser and method which utilize maximum gravitational compaction during discharge of powder into a cartridge or shell.

A further object is to provide a powder measuring and dispensing apparatus which is portable and readily adaptable for field use, which can be positioned to prevent compaction in the measuring chamber while not in use, which utilizes relatively few parts, and which is inexpensive to manufacture and easy to disassemble for cleaning and maintenance.

Briefly, these and other objects of the invention are accomplished by an apparatus which includes a housing formed to be secured to a bench or table, a horizontally disposed hollow cylinder with supply and discharge ports through the top and bottom in the same vertical plane but offset horizontally from each other, a hopper on the top of the housing for mounting a bulk powder container which communicates with the supply port and the cylinder, and a drop tube on the bottom formed to receive a cartridge or shell which communicates with the discharge port and the cylinder. A rotary plug within the cylinder includes a hand crank attached to one end, and a diametral bore, one end of which tapers to a small opening for registering with either the supply port or discharge port. The other end is closed by a concave disc attached to a micrometer spindle slidable along the length of the bore forming thereby a variable volume charge chamber. The barrel of the micrometer extends radially from the other end of the bore and moves in a helical slot on one side of the housing between the supply port and the discharge port. Thus, in the upright or start position the tapered opening registers with the supply port and the chamber fills by gravity with powder from the bulk container. The chamber is inverted by rotating the crank 180° as the tapered opening moves in a helical path to a position where it registers with the discharge port. Any powder within the chamber therefore empties into the cartridge. When the crank is returned to the start position, there is a clear view into the cartridge to verify it has been properly filled. The concavity of the micrometer disc eliminates sharp corners and niches within the chamber where powder might cake into a hard mass, and the small cut-off area of the chamber opening reduces the likelihood of uneven leveling of the powder. Both of these features enhance the accuracy and repeatability of measurements.

BRIEF DESCRIPTION OF THE DRAWINGS

For a better understanding of these and other objects and aspects of the invention, reference will be made to the following detailed description taken in conjunction with the accompanying drawings wherein:

FIG. 1 is a side view of a powder measuring and dispensing apparatus according to the invention in the upright operating position for receiving a measured charge;

FIG. 2 is an end view of the apparatus of FIG. 1; and

DESCRIPTION OF THE PREFERRED EMBODIMENT

Figure 3:
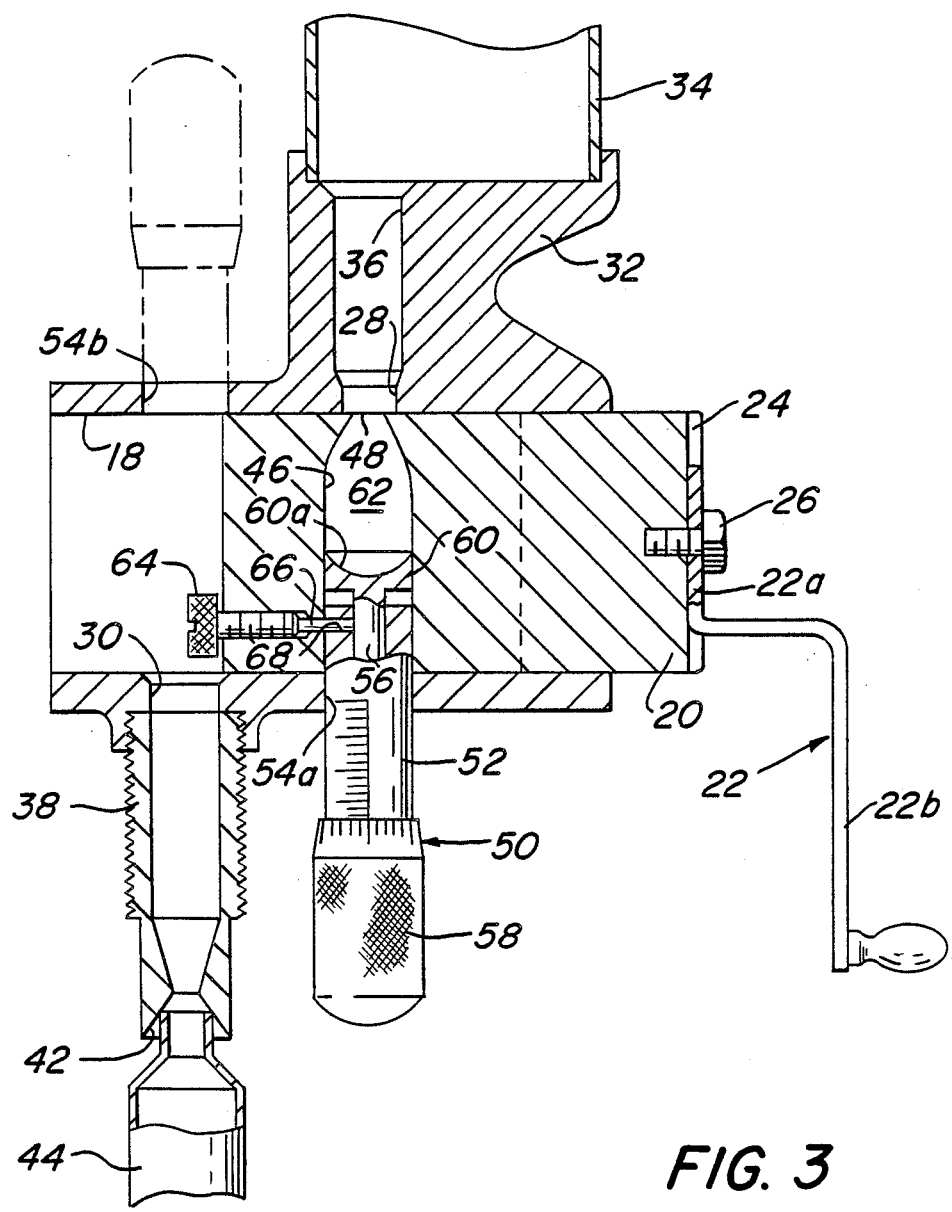
FIG. 3 is a cross-sectional view of the apparatus taken along the line 3—3 of FIG. 2.

Referring now to the drawings wherein like characters designate like or corresponding parts throughout the several views, there is shown a powder measuring and dispensing apparatus 10 in an operating position for receiving a measured quantity of powder by gravitation. A housing 12 includes a lug 14 extending from one side and secured by a fastener 16 to a table T or other convenient means of rigid support. A hollow cylinder 18, extending on a horizontal axis A—A through the entire housing 12, slidably receives a charging plug 20 rotatable and translatable by a hand crank 22 secured at one end in a diametral groove 24 by a threaded fastener 26. The portion 22a of the crank, within groove 24, is offset from the extended portion 22b to permit full axial translation of block 20 as described hereinafter.

Housing 12 includes a supply port 28 and a discharge port 30 radially disposed 180° apart in the vertical plane passing through axis A—A and offset from each other along axis A—A. A hopper 32 integral with the top of housing 12 is formed to receive a bulk powder container 34 which communicates through a vertical passageway 36 in hopper 32 with supply port 28. A vertical drop tube 38 threadingly engaged at one end to the discharge port 30 is formed with a tapered opening 42 at the other end for receiving the open end of a cartridge or shell 44.

A diametral bore 46 extends entirely through plug 20 and tapers at one end to a reduced opening 48. The other end is closed by a micrometer 50 which includes a barrel 52 radially extending through a helical slot 54 formed in one side of housing 12. One end 54a terminates diametrically across from the supply port 28 and the other end 54b terminates diametrically across from discharge port 30. As plug 20 is rotated by crank 22, barrel 52 slides in slot 54 to guide opening 48 into registering with either of ports 28 and 30.

A stem 56 axially movable within micrometer barrel 52 by a thimble 58 includes a disc 60 slidable in bore 46 forming thereby a variable volume chamber 62 for receiving a measured charge. The face 60a of disc 60 is concaved to form a sloping juncture with bore 46 thereby avoiding sharp crevices within chamber 62 where powder may build up. The axial position of disc 60 is changed by rotation of thimble 58 and is indicated on the linear and vernier scales of barrel 52 and thimble 58, respectively. A set screw 64 threaded through the end of plug 20 opposite from crank 22 includes a stud 66 at the end thereof which slides through an opening 68 in barrel 52 and frictionally engages stem 56 locking it and disc 60 in the adjusted position.

A summary of operation of the powder measuring and dispensing apparatus as described above is summarized as follows. Micrometer 50 may now be set at the vernier scales at a value specified for the precise amount of charge to be thrown, and set screw 62 tightened until stem 56 is locked. As an initial precaution, chamber 62 should be visually inspected to assure it contains no residual powder or debris before a new charge is thrown. With dispenser 10 then secured to Table T or other convenient rigid support means by fastener 16, crank 22 is turned until chamber 62 is inverted over discharge port 30. In this cavity position, bulk powder container 34 may be placed in hopper 32 filling passageway 36 and supply port 28 down to charging plug 20. Crank 22 may now be turned 180° until chamber 62 is under port 28 where it fills with a precise volume of powder from passageway 36 up to the reduced opening 48. With the open end of an empty cartridge 44 abutting the tapered end 42 of drop tube 38, crank 22 is turned back toward the inverted position of chamber 62. Due to the small opening 48, any uneven leveling of powder due to cut off at the rim of supply port 28 is negligible. When opening 48 becomes registered with discharge port 30, the measure quantity of powder drops into the cartridge or shell 44. Chamber 62 is then returned to supply port 28 for another measured charge. While in this position and before the cartridge is removed from tapered end 42, it should be visually inspected through slot end 54b and discharge port 30. Test results of an apparatus constructed according to the invention show a substantial reduction in charge error over prior art designs. For example, in 30 consecutive charges thrown of 8 grains WW571 powder for the .28 cal. Schuetzen rifle, the error was ±0.035 grains, or 0.44%.

Some of the many advantages and novel features of the invention should now be readily apparent. For example, a dispensing apparatus is provided which dispenses a precise quantity of powder into a cartridge or shell with a high degree of repeatability. The powder is charged and discharged vertically providing maximum gravitational compaction, more efficient discharge of powder from the chamber, and higher accuracy charges thrown. The charging chamber is shaped to minimize crevices and niches where powder grains could otherwise build up from previous throws, and is tapered to reduce the cut-off area at the inlet where uneven leveling could occur. The cartridge or shell can be visually inspected before it is removed from the dispenser to ascertain that all of the measured powder has been discharged from the measuring chamber, and an operator can leave the handle in the up or discharge position between charges to avoid excessive compaction due to bench vibrations. The dispenser is constructed of only a few parts which makes it inexpensive to manufacture and easy to take apart for periodic inspection and cleaning.

It will be understood that various changes in the details, steps and arrangement of parts, which have been described herein and illustrated in order to explain the nature of the invention may be made by those skilled in the art within the principle and scope of the invention as expressed in the appended claims.

I claim:

1. Apparatus for measuring and dispensing a precise quantity of granular material comprising, in combination;

a cylinder having an inlet port and an outlet port radially disposed 180° apart and offset from each other along the cylindrical axis of said cylinder for passing the material therethrough, and a helical slot through the side of said cylinder communicating at the ends thereof with said inlet and outlet ports respectively;

plug means rotatable about and translatable along said axis and slidably contacting the interior surface of said cylinder, said plug means having an elongate bore therethrough and transverse to the cylindrical axis; and guide means axially extending from one end of said bore through said slot and slidably contacting the sides of said slot;

whereby said other end of said bore communicates with either of said ports when said plug means is rotated 180° in said cylinder.

2. Apparatus according to claim 1 further comprising:

a lug extending from said cylinder for mounting on support structure with the cylindrical axis in a horizontal plane and the inlet port on top;

a hopper communicating with said inlet port for gravity feeding a measured portion of a bulk supply of the material into said bore when said other end thereof registers with said inlet port; and a drop tube communicating with said outlet port for gravity dispensing the measured portion with said other end of said bore registers with said outlet port.

3. Apparatus according to claim 1 wherein said guide means further includes:

disc means slidable along the length of said bore forming a chamber at said other end of said bore; and adjusting means operatively connected to said disc means for varying the volume of said chamber.

4. Apparatus according to claim 3 further comprising:

locking means operatively connected to said adjusting means for securing said disc means in an adjusted position.

5. Apparatus according to claim 3 wherein:
said disc includes a concave surface in said chamber forming a sloping juncture with said bore for preventing material build-up therein.

6. Apparatus according to claim 1 wherein:
said other end of said bore is tapered to form a reduced opening at the interface of said cylinder and said plug for minimizing uneven leveling of the material with said other end of said bore is rotated from said inlet port.

7. A powder measuring and dispensing apparatus comprising, in combination:
a cylindrical housing having an upper inlet port and a lower outlet port axially offset from each other;
a plug rotatable within and translatable along said housing and having a chamber with an opening on the surface of said plug selectively communicating with respective ones of said ports; and
guide means operatively connected between said housing and said plug for positioning said opening at said inlet port for gravity filling a measured quantity of powder into said chamber, or at said outlet port for gravity dispensing the measured quantity of powder.

8. A powder measuring and dispensing apparatus according to claim 7 further comprising:
adjusting means operatively connected to said guide means for varying the volume of said chamber; and
scale means connected to said adjusting means for indicating the volume of said chamber.

9. A powder measuring and dispensing apparatus according to claim 6 further comprising:
locking means connected to said plug for fixing the adjusting means at an indicated volume of said chamber.

10. A powder measuring and dispensing apparatus according to claim 5 further comprising:
a hopper disposed above and communicating with said inlet port formed to hold a bulk supply of the powder; and
a drop tube disposed below and communicating with said outlet port formed for retaining a cartridge shell to receive the dispensed powder.

11. Apparatus according to claim 5 further comprising:
a lug extending from said housing for mounting on support structure with the inlet port on top.

12. A powder measuring and dispensing apparatus according to claim 7 wherein:
said chamber is tapered to a reduced area at said opening.

13. A powder measuring and dispensing apparatus according to claim 8 wherein:
said adjusting means includes a concave surface in said chamber forming a sloping juncture with said bore.

14. A method for measuring and dispensing a precise powder charge, comprising the steps of:
registering the opening of an upright charging chamber of a selected volume with an inlet port for gravity filling the chamber with powder from a bulk supply through said port; and
simultaneously inverting and translating the charging chamber to a position registering the opening of the chamber with an outlet port for gravity discharging the powder in the chamber into a cartridge.

* * * * *